US011003857B2

(12) United States Patent
Santiago et al.

(10) Patent No.: US 11,003,857 B2
(45) Date of Patent: May 11, 2021

(54) SYSTEM FOR AUGMENTING CONVERSATIONAL SYSTEM TRAINING WITH REDUCTIONS

(71) Applicant: International Business Machines Corporation, Armonk, NY (US)

(72) Inventors: Joanne M. Santiago, Austin, TX (US); Donna K. Byron, Petersham, MA (US); Benjamin L. Johnson, Baltimore City, MD (US); Priscilla Moraes, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/108,358

(22) Filed: Aug. 22, 2018

(65) Prior Publication Data
US 2020/0065373 A1     Feb. 27, 2020

(51) Int. Cl.
*G06F 40/295*     (2020.01)
*G06K 9/62*       (2006.01)
(Continued)

(52) U.S. Cl.
CPC .......... *G06F 40/295* (2020.01); *G06F 16/903* (2019.01); *G06F 16/951* (2019.01);
(Continued)

(58) Field of Classification Search
CPC ..... G06F 40/253; G06F 40/284; G06F 40/295
See application file for complete search history.

(56) References Cited

U.S. PATENT DOCUMENTS

| 8,589,370 B2 * | 11/2013 | Feng | G06F 40/14 |
| | | | 707/705 |
| 2002/0032565 A1 * | 3/2002 | Rose | G10L 15/19 |
| | | | 704/240 |

(Continued)

FOREIGN PATENT DOCUMENTS

| WO | WO 1996022594 | * 12/1995 | |
| WO | WO-2015177861 A1 * | 11/2015 | ............. G06F 40/20 |
| WO | WO2015177861 A1 | 11/2015 | |

OTHER PUBLICATIONS

Acronymify, http://acronymify.com/, printed Aug. 7, 2018.
(Continued)

*Primary Examiner* — Feng-Tzer Tzeng
(74) *Attorney, Agent, or Firm* — Terrile, Cannatti & Chambers, LLP; Emmanuel A. Rivera

(57) ABSTRACT

A method, system and computer-usable medium for augmenting the training of a conversational system. In certain embodiments, the method comprises: ingesting a training set to be used in training of the conversational system, the training set including objects for use in the training, wherein the objects include one or more object types, wherein the object types include one or more of an entity or intent; generating proposed reductions for inclusion in an augmented training set, wherein the proposed reductions include one or more of: reduction candidates generated using properties of objects included in the training set; reduction candidates obtained from search queries of one or more external resources, wherein the search queries relate to one or more objects included in the training set; filtering the proposed reductions to generate a reduced set of proposed reductions; and augmenting the training set with the reduced set of proposed reductions.

17 Claims, 5 Drawing Sheets

(51) Int. Cl.
  *G06N 20/00* (2019.01)
  *G06F 16/903* (2019.01)
  *G06F 16/951* (2019.01)
  *G06F 40/242* (2020.01)
  *G06F 40/253* (2020.01)
  *G06F 40/284* (2020.01)

(52) U.S. Cl.
  CPC ......... *G06F 40/242* (2020.01); *G06K 9/6256* (2013.01); *G06N 20/00* (2019.01); *G06F 40/253* (2020.01); *G06F 40/284* (2020.01)

(56) References Cited

U.S. PATENT DOCUMENTS

| | | | | |
|---|---|---|---|---|
| 2005/0267757 | A1* | 12/2005 | Iso-Sipila | G10L 15/187 704/260 |
| 2008/0033714 | A1* | 2/2008 | Gupta | G06F 40/284 704/9 |
| 2012/0109974 | A1* | 5/2012 | Feng | G06F 40/284 707/748 |
| 2013/0246047 | A1* | 9/2013 | Vassilieva | G06F 40/295 704/9 |
| 2016/0103808 | A1 | 4/2016 | Anders et al. | |
| 2017/0371862 | A1* | 12/2017 | Chowdhury | G06F 40/30 |

OTHER PUBLICATIONS

Willis, Tim et al, Informing Flexible Abbreviation Expansion for Users with Motor Disabilities, Jul. 4, 2002 http://citeseerx.ist.psu.edu/viewdoc/download?doi=10.1.1.100.4492&rep=rep1&type=pdf.

Yu, Zhonghua et al., Automatic Resolution of Ambiguous Abbreviations in Biomedical Texts Using Support Vector Machines and One Sense per Discourse Hypothesis, Jan. 2003 https://pdfs.semanticscholar.org/6bb5/5f639e1670ebb906b0d6ede55af6384f1230.pdf.

Atzeni, Paolo et al., An Automatic Identification and Resolution System for Protein-Related Abbreviations in Scientific Papers, European Conference on Evolutionary Computation, Machine Learning and Data Mining in Bioinformatics, Springer, Berlin, Heidelberg, 2011.

High, Rob, "The Era of Cognitive Systems: An Inside Look at IBM Watson and How it Works," IBM Redbooks, 2012.

Yuan, Michael et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM FOR AUGMENTING CONVERSATIONAL SYSTEM TRAINING WITH REDUCTIONS

BACKGROUND OF THE INVENTION

Field of the Invention

The present invention relates in general to the field of computers and similar technologies, and in particular to software utilized in this field. Still more particularly, it relates to a method, system and computer-usable medium for augmenting conversational system training with reductions.

Description of the Related Art

Conversational systems, such as chatbots, interactive agents, and Artificial Conversational Entities include programming which conducts a conversation via auditory or textual methods. Such programming is often designed to convincingly simulate how a human would behave as a conversational partner. Users often engage such conversational systems using reductions.

A reduction is a phrase or set of characters that is otherwise formed by a larger string. Such reductions may include acronyms, abbreviations, and initialisms. For example, IBM is a short form of the term "International Business Machines," of which the latter is IBM's corresponding long form.

SUMMARY OF THE INVENTION

A method, system and computer-usable medium are disclosed for augmenting the training of a conversational system with a set of proposed reductions. In certain embodiments, the method comprises: ingesting a training set to be used in training of the conversational system, the training set including objects for use in the training, wherein the objects include one or more object types, wherein the object types include one or more of an entity or intent; generating proposed reductions for inclusion in an augmented training set, wherein the proposed reductions include one or more of: reduction candidates generated using properties of objects included in the training set; reduction candidates obtained from search queries of one or more external resources, wherein the search queries relate to one or more objects included in the training set; filtering the proposed reductions to generate a reduced set of proposed reductions; and augmenting the training set with the reduced set of proposed reductions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
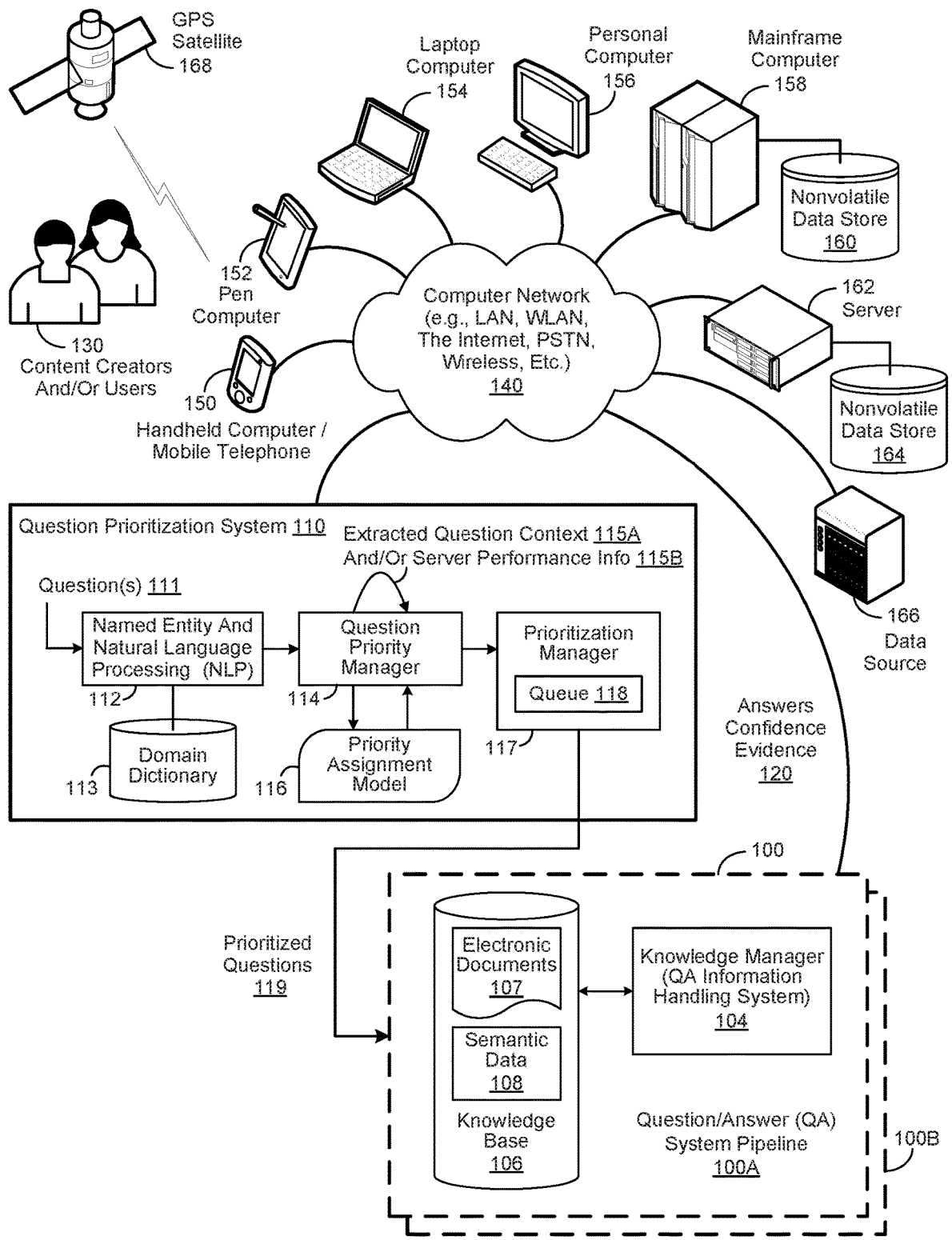
FIG. 1 shows a schematic diagram of one illustrative embodiment of a question/answer (QA) system.

The present invention may be a system, a method, and/or a computer program product. In addition, selected aspects of the present invention may take the form of an entirely hardware embodiment, an entirely software embodiment (including firmware, resident software, microcode, etc.), or an embodiment combining software and/or hardware aspects that may all generally be referred to herein as a "circuit," "module" or "system." Furthermore, aspects of the present invention may take the form of computer program product embodied in a computer-readable storage medium, or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a dynamic or static random access memory (RAM), a read-only memory (ROM), an erasable programmable read-only memory (EPROM or Flash memory), a magnetic storage device, a portable Compact Disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer-readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a schematic diagram of one illustrative embodiment of a QA system 100 and a question prioritization system 110 connected to a computer network 140 to operate as a conversational system. The QA system 100 includes a knowledge manager 104 that is connected to a knowledge base 106 and configured to provide QA generation functionality for one or more content creators and/or users 130 who submit content across the network 140 to the QA system 100. To assist with efficient sorting and presentation of questions to the QA system 100, the question prioritization system 110 may be connected to the computer network 140 to receive user questions, and may include a plurality of sub-systems which interact with cognitive systems, like the QA system 100, to prioritize questions or requests being submitted to the QA system 100.

The Named Entity sub-system 112 receives and processes each question 111 by using natural language processing (NLP) to analyze each question and extract question topic information contained in the question, such as named entities, phrases, urgent terms, and/or other specified terms which are stored in one or more domain entity dictionaries 113. By leveraging a plurality of pluggable domain dictionaries 113 relating to different domains or areas (e.g., travel, healthcare, electronics, game shows, financial services, etc.), the domain dictionary 113 enables critical and urgent words (e.g., "threat level") from different domains (e.g., "travel") to be identified in each question based on their presence in the domain dictionary 113. To this end, the Named Entity sub-system 112 may use an NLP routine to identify the question topic information in each question. As used herein, "NLP" broadly refers to the field of computer science, artificial intelligence, and linguistics concerned with the interactions between computers and human (natural) languages. In this context, NLP is related to the area of human-computer interaction and Natural Language understanding by computer systems that enable computer systems to derive meaning from human or Natural Language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 113.

The Question Priority Manager sub-system 114 performs additional processing on each question to extract question context information 115A. In addition, or in the alternative, the Question Priority Manager sub-system 114 may also extract server performance information 115B for the question prioritization system 110 and/or QA system 100. In selected embodiments, the extracted question context information 115A may include data that identifies the user context and location when the question was submitted or received. For example, the extracted question context information 115A may include data that identifies the user who submitted the question (e.g., through login credentials), the device or computer which sent the question, the channel over which the question was submitted, or any combination thereof. Other examples may include the location of the user or device that sent the question, any special interest location indicator (e.g., hospital, public-safety answering point, etc.), other context-related data for the question, or any combination thereof. In certain embodiments, the location information is determined through the use of a Geographical Positioning System (GPS) satellite 168. In these embodiments, a handheld computer or mobile telephone 150, or other device, uses signals transmitted by the GPS satellite 168 to generate location information, which in turn is provided via the computer network 140 to the Question Priority Manager sub-system 114 for processing.

In various embodiments, the source for the extracted context information 115A may be a data source 166 accessed through the computer network 140. Examples of a data source 166 include systems that provide telemetry information, such as medical information collected from medical equipment used to monitor a patient's health, environment information collected from a facilities management system, or traffic flow information collected from a transportation monitoring system. In certain embodiments, the data source 166 may be a storage area network (SAN) or other network-based repositories of data.

In various embodiments, the data source 166 may provide data directly or indirectly collected from "big data" sources. In general, big data refers to a collection of datasets so large and complex that traditional database management tools and data processing approaches are inadequate. These datasets can originate from a wide variety of sources, including computer systems (e.g., 156, 158, 162), mobile devices (e.g., 150, 152, 154), financial transactions, streaming media, social media, as well as systems (e.g., 166) commonly associated with a wide variety of facilities and infrastructure (e.g., buildings, factories, transportation systems, power grids, pipelines, etc.). Big data, which is typically a combination of structured, unstructured, and semi-structured data poses multiple challenges, including its capture, curation, storage, transfer, search, querying, sharing, analysis and visualization.

The Question Priority Manager sub-system 114 may also determine or extract selected server performance data 115B for the processing of each question. In certain embodiments, the server performance information 115B may include operational metric data relating to the available processing resources at the question prioritization system 110 and/or QA system 100, such as operational or run-time data, CPU utilization data, available disk space data, bandwidth utilization data, and so forth. As part of the extracted information 115A/B, the Question Priority Manager sub-system 114 may identify the Service Level Agreement (SLA) or Quality of Service (QoS) processing requirements that apply to the question being analyzed, the history of analysis and feedback for the question or submitting user, and the like. Using the question topic information and extracted question context 115A and/or server performance information 115B, the Question Priority Manager sub-system 114 is configured to populate feature values for the Priority Assignment Model 116. In various embodiments, the Priority Assignment Model 116 provides a machine learning predictive model for generating target priority values for the question, such as by using an artificial intelligence (AI) approaches known to those of skill in the art. In certain embodiments, the AI logic is used to determine and assign a question urgency value to each question for purposes of prioritizing the response processing of each question by the QA system 100.

The Prioritization Manager sub-system 117 performs additional sort or rank processing to organize the received questions based on at least the associated target priority values such that high priority questions are put to the front of a prioritized question queue 118 for output as prioritized questions 119. In the question queue 118 of the Prioritization Manager sub-system 117, the highest priority question is placed at the front of the queue for delivery to the assigned QA system 100. In selected embodiments, the prioritized questions 119 from the Prioritization Manager sub-system 117 that have a specified target priority value may be assigned to a particular pipeline (e.g., QA system pipeline 100A, 100B) in the QA system 100. As will be appreciated, the Prioritization Manager sub-system 117 may use the question queue 118 as a message queue to provide an asynchronous communications protocol for delivering prioritized questions 119 to the QA system 100. Consequently, the Prioritization Manager sub-system 117 and QA system 100 do not need to interact with a question queue 118 at the same time by storing prioritized questions in the question queue 118 until the QA system 100 retrieves them. In this way, a wider asynchronous network supports the passing of prioritized questions 119 as messages between different QA system pipelines 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager sub-system 117 may be configured to convert oversubscribing questions into asynchronous responses, even if they were asked in a synchronized fashion.

The QA system 100 may include one or more QA system pipelines 100A, 100B, each of which includes a computing device 104 comprising one or more processors and one or more memories. The QA system pipelines 100A, 100B may likewise include potentially any other computing device elements generally known in the art including buses, storage devices, communication interfaces, and the like. In various embodiments, these computing device elements may be implemented to process questions received over the network 140 from one or more content creator and/or users 130 at computing devices (e.g., 150, 152, 154, 156, 158, 162). In certain embodiments, the one or more content creator and/or users 130 are connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable QA generation functionality for one or more content users 130. Other embodiments of QA system 100 may be used with components, systems, sub-systems, and/or devices other than those that are depicted herein.

In each QA system pipeline 100A, 100B, a prioritized question 119 is received and prioritized for processing to generate an answer 120. In sequence, prioritized questions 119 are de-queued from the shared question queue 118, from which they are de-queued by the pipeline instances for processing in priority order rather than insertion order. In selected embodiments, the question queue 118 may be implemented based on a "priority heap" data structure. During processing within a QA system pipeline (e.g., 100A, 100B), questions may be split into multiple subtasks, which run concurrently. In various embodiments, a single pipeline instance may process a number of questions concurrently, but only a certain number of subtasks. In addition, each QA system pipeline 100A, 100B may include a prioritized queue (not shown) to manage the processing order of these subtasks, with the top-level priority corresponding to the time that the corresponding question started (i.e., earliest has highest priority). However, it will be appreciated that such internal prioritization within each QA system pipeline 100A, 100B may be augmented by the external target priority values generated for each question by the Question Priority Manager sub-system 114 to take precedence, or ranking priority, over the question start time. In this way, more important or higher priority questions can "fast track" through a QA system pipeline 100A, 100B if it is busy with already-running questions.

In the QA system 100, the knowledge manager 104 may be configured to receive inputs from various sources. For example, knowledge manager 104 may receive input from the question prioritization system 110, network 140, a knowledge base or corpus of electronic documents 107 or other data, semantic data 108, content creators, and/or users 130, and other possible sources of input. In selected embodiments, some or all of the inputs to knowledge manager 104 may be routed through the network 140 and/or the question prioritization system 110. The various computing devices (e.g., 150, 152, 154, 156, 158, 162) on the network 140 may include access points for content creators and/or users 130. Some of the computing devices may include devices for a database storing a corpus of data as the body of information used by the knowledge manager 104 to generate answers to cases. The network 140 may include local network connections and remote connections in various embodiments, such that knowledge manager 104 may operate in environments of any size, including local (e.g., a LAN) and global (e.g., the Internet). Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, a content creator 130 creates content (e.g., a document) in a knowledge base 106 for use as part of a corpus of data used in conjunction with knowledge manager 104. In selected embodiments, the knowledge base 106 may include any file, text, article, or source of data (e.g., scholarly articles, dictionary definitions, encyclopedia references, and the like) for use by the knowledge manager 104. Content users 130 may access the knowledge manager 104 via a network connection or an Internet connection to the network 140, and may input questions to the knowledge manager 104 that may be answered by the content in the corpus of data.

As further described below, when a process evaluates a given section of a document for semantic content, the process can use a variety of conventions to query it from the knowledge manager 104. One convention is to send a well-formed question. As used herein, semantic content broadly refers to content based upon the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., Natural Language questions, etc.) to the knowledge manager 104. In various embodiments, the knowledge manager 104 may interpret the question and provide a response to the content user containing one or more answers to the question. In some embodiments, the knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 119 and the language used in each of the portions of the corpus of data found during the application of the queries using a variety of reasoning algorithms. There may be hundreds or even thousands of reasoning algorithms applied, each of which performs different analysis (e.g., comparisons), and generates a score. For example, certain reasoning algorithms may look at the matching of terms and synonyms within the language of the input question and the found portions of the corpus of data. Other reasoning algorithms may look at temporal or spatial features in the language, while yet others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 120 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 150 to large mainframe systems, such as mainframe computer 158. Examples of handheld computer 150 include personal digital assistants (PDAs), personal entertainment devices, such as MP3 players, portable televisions, and Compact Disc players. Other examples of information processing systems include pen, or tablet, computer 152, laptop, or notebook, computer 154, personal computer system 156, server 162, and mainframe computer 158.

As shown, the various information processing systems can be networked together using computer network 140. Types of computer network 140 that can be used to interconnect the various information processing systems include PANs, LANs, Wireless Local Area Networks (WLANs), the Internet, the PSTN, other wireless networks, and any other network topology that can be used to interconnect the information processing systems.

Figure 2:
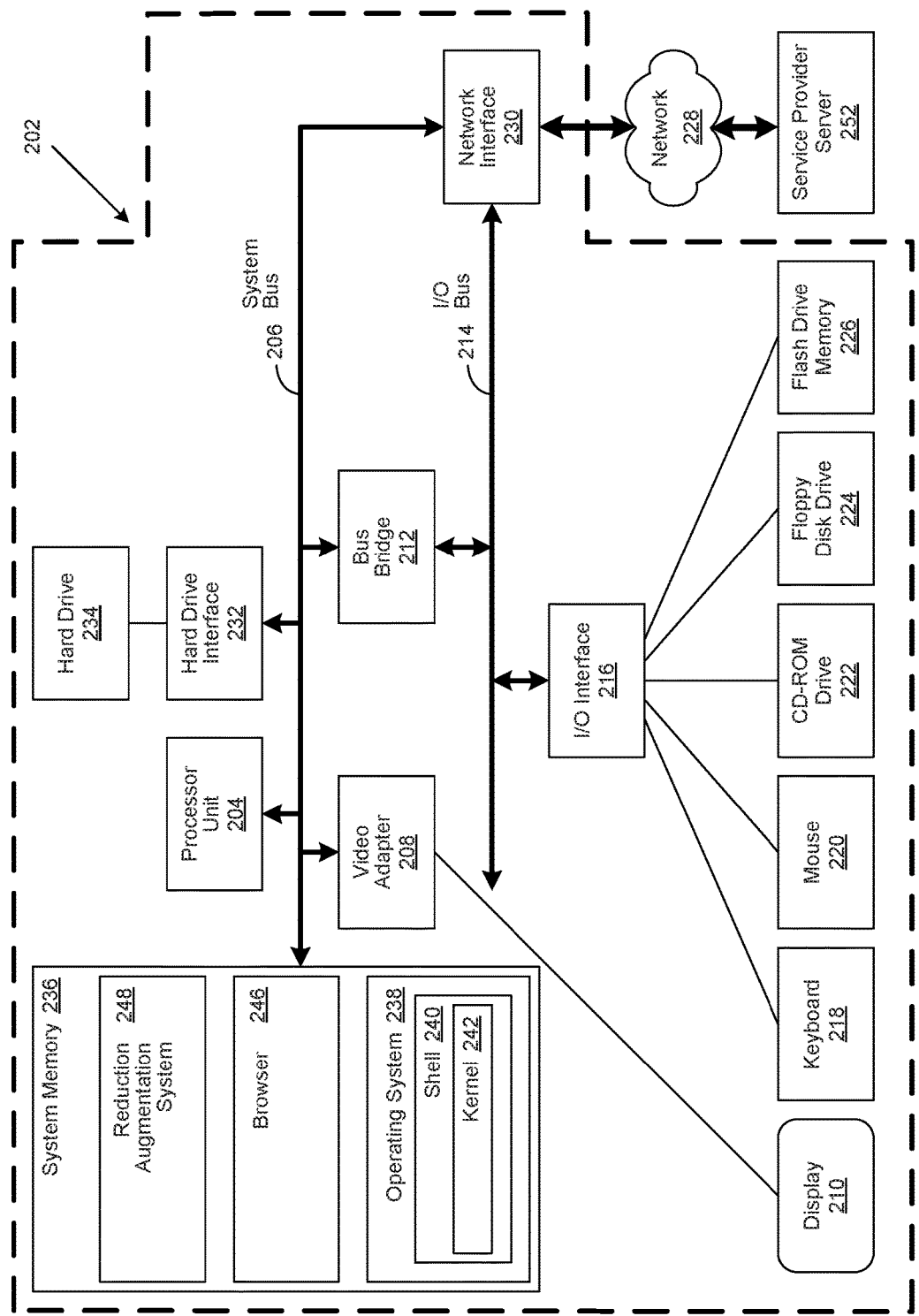
FIG. 2 shows a simplified block diagram of an information processing system capable of performing computing operations.

In selected embodiments, the information processing systems include nonvolatile data stores, such as hard drives and/or nonvolatile memory. Some of the information processing systems may use separate nonvolatile data stores. For example, server 162 utilizes nonvolatile data store 164, and mainframe computer 158 utilizes nonvolatile data store 160. The nonvolatile data store can be a component that is external to the various information processing systems or can be internal to one of the information processing systems. An illustrative example of an information processing system showing an exemplary processor and various components commonly accessed by the processor is shown in FIG. 2.

In various embodiments, the QA system 100 is implemented to receive a variety of data from various computing devices (e.g., 150, 152, 154, 156, 158, 162) and data sources 166, which in turn is used to perform QA operations described in greater detail herein. In certain embodiments, the QA system 100 may receive a first set of information from a first computing device (e.g., laptop computer 154). The QA system 100 then uses the first set of data to perform QA processing operations resulting in the generation of a second set of data, which in turn is provided to a second computing device (e.g., server 162). In response, the second computing device may process the second set of data to generate a third set of data, which is then provided back to the QA system 100. In turn, the QA system may perform additional QA processing operations on the third set of data to generate a fourth set of data, which is then provided to the first computing device.

In certain embodiments, a first computing device (e.g., server 162) may receive a first set of data from the QA system 100, which is then processed and provided as a second set of data to another computing device (e.g., mainframe 158). The second set of data is processed by the second computing device to generate a third set of data, which is provided back to the first computing device. The second computing device then processes the third set of data to generate a fourth set of data, which is then provided to the QA system 100, where it is used to perform QA operations described in greater detail herein.

In one embodiment, the QA system may receive a first set of data from a first computing device (e.g., handheld computer/mobile device 150), which is then used to perform QA operations resulting in a second set of data. The second set of data is then provided back to the first computing device, where it is used to generate a third set of data. In turn, the third set of data is provided back to the QA system 100, which then provides it to a second computing device (e.g., mainframe computer 158), where it is used to perform post processing operations.

As an example, a content user 130 may ask the question, "I'm looking for a good pizza restaurant nearby." In response, the QA system 100 may provide a list of three such restaurants in a half mile radius of the content user. In turn, the content user 130 may then select one of the recommended restaurants and ask for directions, signifying their intent to proceed to the selected restaurant. In this example, the list of recommended restaurants, and the restaurant the content user 130 selected, would be the third set of data provided to the QA system 100. To continue the example, the QA system 100 may then provide the third set of data to the second computing device, where it would be processed to generate a database of the most popular restaurants, by classification, location, and other criteria.

In various embodiments the exchange of data between various computing devices (e.g., 150, 152, 154, 156, 158, 162) results in more efficient processing of data as each of the computing devices can be optimized for the types of data it processes. Likewise, the most appropriate data for a particular purpose can be sourced from the most suitable computing device (e.g., 150, 152, 154, 156, 158, 162), or data source 166, thereby increasing processing efficiency. Skilled practitioners of the art will realize that many such embodiments are possible and that the foregoing is not intended to limit the spirit, scope or intent of the invention.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disc-Read-Only Memory (CD-ROM) drive 222, a floppy disk drive 224, and a flash drive memory 226. The format of the ports connected to I/O interface 216 may be any known to those skilled in the art of computer architecture, including, but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, the information processing system 202 is able to access a service provider server 252 to implement the present invention.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. In certain embodiments, system memory 236 may also include a Browser 246 having program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, system memory 236 may also include a reduction augmentation system 248. In various embodiments, the reduction augmentation system 248 includes code for implementing the processes described hereinbelow. In certain embodiments, the information processing system 202 is able to download the reduction augmentation system 248 from a service provider server 252.

The hardware elements depicted in the information processing system 202 are not intended to be exhaustive, but rather are representative to highlight components that may be used to implement the present invention. For instance, the information processing system 202 may include alternate memory storage devices such as magnetic cassettes, DVDs, Bernoulli cartridges, and the like. These and other variations are intended to be within the spirit, scope and intent of the present invention.

The disclosed reduction augmentation system 248 is designed with an appreciation that users often use reductions such as abbreviations, acronyms, restatements, phrasal hash tags, or terms of art that have become a natural part of the vocabulary employed to interact with conversational systems. The design and operation of the reduction augmentation system 248 also appreciates that the conversation designer entering exemplary language used in training a conversational system may not have access to or knowledge of such reductions thereby limiting the ability of the conversational system to analyze and respond to user communications using such reductions.

In appreciation of these limitations, certain embodiments of the reduction augmentation system 248 execute operations that automatically generate reductions that might not otherwise be known to the conversation designer. In certain embodiments, the automatically generated reductions may be used in training the conversational system so that the conversational system is better prepared to analyze such reductions when the reductions are encountered in subsequent classification operations.

Figure 3:
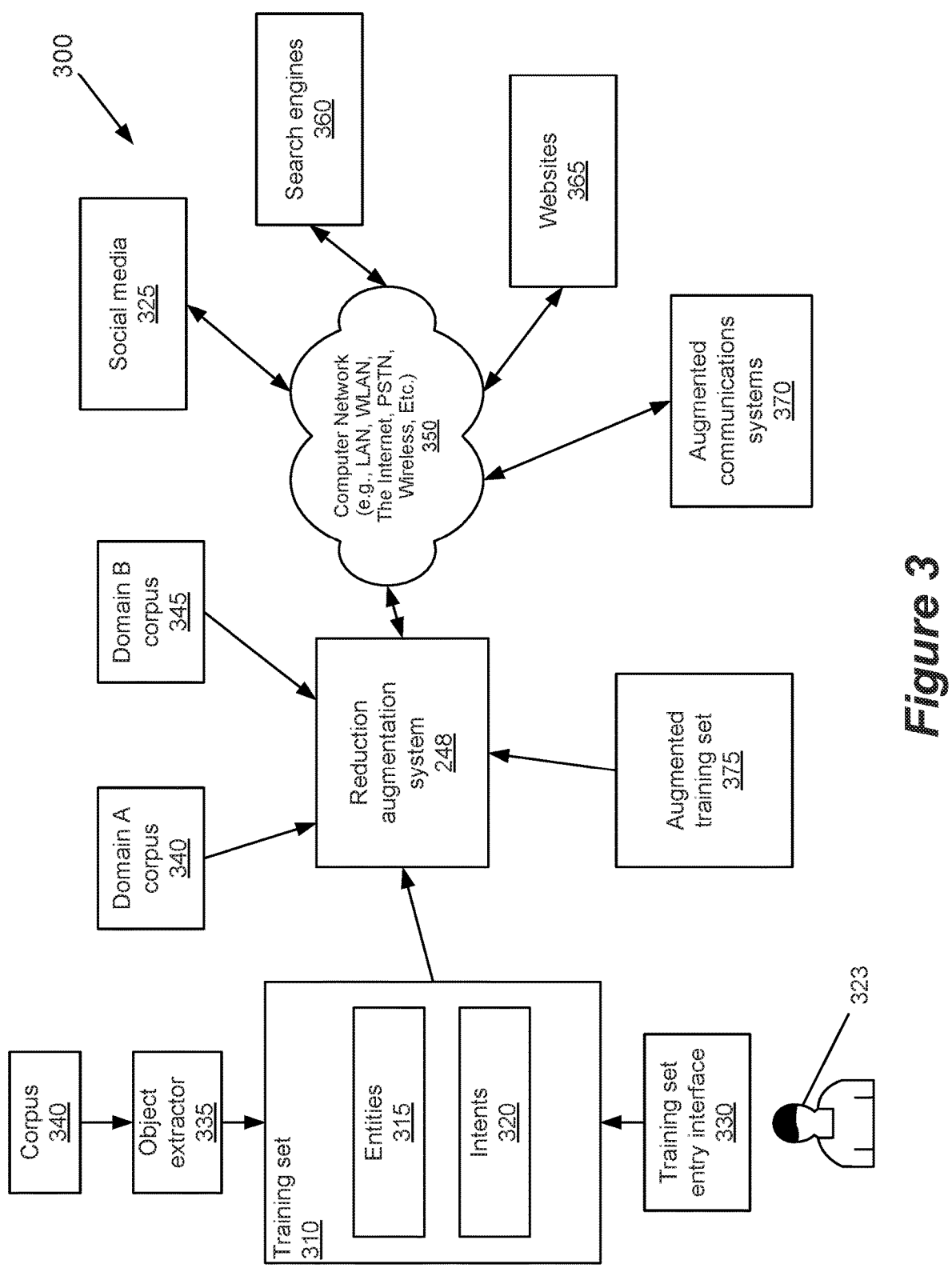
FIG. 3 depicts a simplified block diagram of an electronic environment in which a reduction augmentation system may operate.

FIG. 3 depicts a functional block diagram of an electronic environment 300 in which certain embodiments of the reduction augmentation system 248 may operate. In certain embodiments, the reduction augmentation system 248 is configured to access a training set 310 having objects used in training the conversational system. In certain embodiments, such as those employing IBM's Watson® technology, the objects may include entities 315 and intents 320. In certain embodiments, intents are a group of examples that a user might use to communicate a specific goal or idea, while entities provide a way of handling parts of a user input that is used to alter the way the conversational system response to an intent.

In certain embodiments, one or more individuals, such as a conversation designer 323, interact with the training set 310 through a training set interface 330. In certain embodiments, the conversation designer 323 enters intents objects by defining an intent category and entering intent language that may be encountered by the conversational system when a user wishes to express an intent in that category. In certain embodiments, the conversation designer 323 may enter entity objects by defining an entity category and entering language that may be encountered by the conversational system with respect to the entity categories. In some embodiments, the objects in the training set 310 may be generated using an object extractor 335, which analyzes a corpus 340 that, for example, includes electronic documents having language that the conversation designer 323 wishes to include in the training set 310.

In certain embodiments, the reduction augmentation system 248 may have electronic access to information from one or more systems, some of which are shown in FIG. 3. In certain embodiments, the reduction augmentation system 248 may be configured to access resources such as domain corpus. As used herein, a domain defines a set of common requirements, terminology, and functionality for any conversational system constructed converse with a user in a given field. In certain embodiments, the domain includes conversational language used in a given field of science, such as medicine, biology, or physics. In certain embodiments, the domain includes conversational language used when shopping for a product. In certain embodiments, the domain includes conversational language used to obtain assistance with a problem associated with a product or service. In certain embodiments, the reduction augmentation system 248 may access corpus specific to Domain A 340 and corpus specific to Domain B 345. The corpus 340, 345 may be accessible from within a secured system environment in which the reduction augmentation system 248 operates or from a source external the secured system environment.

In certain embodiments, the reduction augmentation system 248 may be configured to communicate with a computer network 350 through which the reduction augmentation system 248 may access one or more external resources. In certain embodiments, the external resources include social media sites 355, search engines 360, websites 365, and augmented communications systems 370. In certain embodiments, the reduction augmentation system 248 uses data in the training set 310 as well as information obtained from one or more of the resources to generate an augmented training set 375, which includes proposed reductions that may be incorporated by the conversation designer 323 to train the conversational system.

Figure 4:
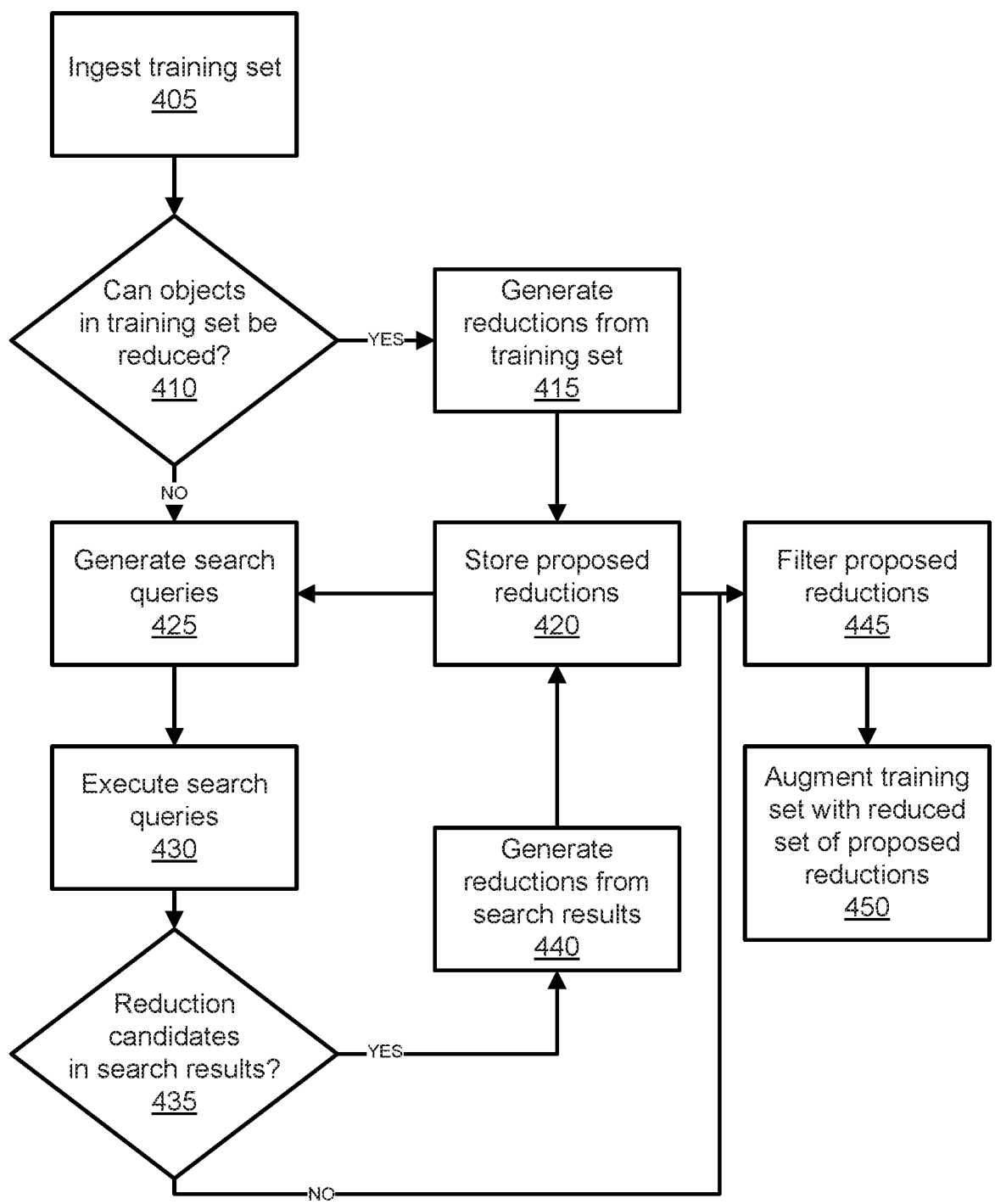
FIG. 4 is a flow diagram depicting examples of operations that may be executed by the reduction augmentation system.

FIG. 4 is a flowchart depicting examples of operations that may be executed by the reduction augmentation system 248. In certain embodiments, the reduction augmentation system 248 ingests the training set 310 at operation 405. A determination is made at operation 410 as to whether there are objects already existing in the training set that can be reduced. In certain embodiments, capitalization of objects within the training set to identify reduction candidates. In certain embodiments, entities having several capitalized words in a row, such as "Game of Thrones" or "Miles Per Gallon" may be subject to reduction.

If objects within the training set 310 may be the subject of reductions, reduction candidates for those objects are generated at operation 415 and stored as reduction candidates at operation 420. For example, the reduction augmentation system 248 may infer abbreviations of "GOT" or "G.O.T." from the words "Game of Thrones," and "MPG"

or "M.P.G." from the words "Miles Per Gallon." It will be appreciated by those skilled in the art that other techniques of identifying reduction candidates from the training set 310 may be used and are a matter of design choice once the operation of reduction augmentation system 248 is understood.

In certain embodiments, if a determination is made at operation 410 that there are no reduction candidates that can be generated from the objects in the training set 310, the reduction augmentation system 248 may proceed to operation 425. In certain embodiments, the reduction augmentation system 248 may proceed to operation 425 after reduction candidates from the training set are stored at operation 420.

In certain embodiments, the reduction augmentation system 248 generates one or more search queries at operation 425 and executes those search queries at operation 430. In certain embodiments, the search queries target one or more of searchable resources, such as social media sites 325, general or domain specific search engines 360, websites 365, and/or systems 370 employing augmented communications. In certain embodiments, entities 315 or intents 320 found in the training set 310 are employed to formulate the search queries. In certain embodiments, heuristics from augmented communication systems 370 may be used to propose reduction candidates. In certain embodiments, heuristics may be used with social media searches to generate phrasal reductions like 4u (for you), lol (laugh out loud), and terms used in social media hashtags.

In certain embodiments, the results of the search queries are analyzed at operation 435 to identify reduction candidates. For example, one or more search queries may be directed to the words "Game Of Thrones." In certain embodiments, an analysis of the search results for the query of "Game Of Thrones" may identify reduction candidates that directly represent the words "Game Of Thrones." In certain embodiments, the analysis may identify reduction candidates that do not directly represent the words "Game Of Thrones" but are frequently found in the search results.

If there are reduction candidates that may be generated from the search query results, those reduction candidates are generated at operation 440. In certain embodiments, terms included in the search results may already exist as reductions, but may nevertheless be included as reduction candidates since such reduction candidates may not already exist in the training set 310. In certain embodiments, the reduction candidates may be inferred and generated from language contained in the search results. At operation 420, the reduction candidates generated at operation 440 are stored with the reduction candidates generated at operation 415 for further processing.

In certain embodiments, the reduction candidates stored at operation 420 are filtered at operation 445 to extract a reduced set of proposed reductions, as described in further detail herein. The reduced set of proposed reductions may be used to augment the training set at operation 450. Augmentation of the training set with the proposed reductions may be implemented in various manners. In certain embodiments, the reduction augmentation system 248 may generate an augmented training set 375. In certain embodiments, the augmented training set 375 may include all of the objects of the original training set 310 with the addition of the proposed reductions. In certain embodiments, the reduction augmentation system 248 is configured to automatically replace the entire training set 310 with the augmented training set 375. In certain embodiments in which the entire training set 310 is replaced, the conversation designer 323 may be provided with an opportunity to select which of the new reductions are to be incorporated into the final version of the training set 310. In certain embodiments, only the proposed reductions are included in the augmented training set 375 and the proposed reductions are used to update the training set 310, for example, through manual or automated entry of the new reductions into the training set 310 by the conversation designer 323.

Figure 5:
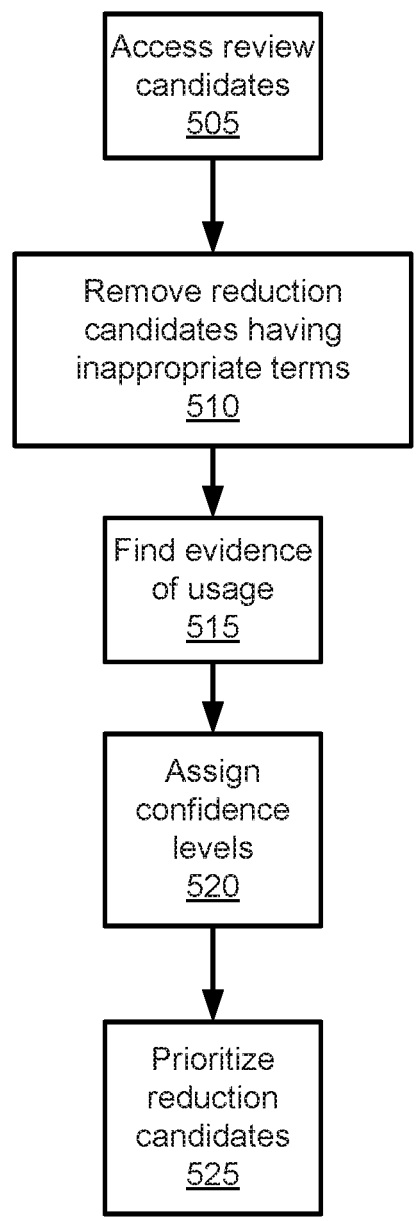
FIG. 5 is a flow diagram depicting examples of operations that may be executed by the reduction augmentation system for reduction candidate filtering.

FIG. 5 is a flowchart depicting examples of operations that may be executed to filter the reduction candidates to provide a reduced set of proposed reductions. In this example, the reduction augmentation system 248 accesses the reduction candidates stored, for example, at operation 420 of FIG. 4, for use in the filtration process. At operation 510, reduction candidates that have synthetically generated inappropriate terms are removed from the reduction candidates. For example, certain reduction candidates generated by the reduction augmentation system 248 may inadvertently include profanity or other inappropriate language.

Evidence of usage of the reduction candidates is undertaken at operation 515. In certain embodiments, the reduction augmentation system 248 may conduct electronic searches to determine whether and/or how frequently each reduction candidate is used and, in certain embodiments, the manner in which it is used. In certain embodiments, the searches for the reduction candidates target one or more external resources, such as social media sites 355, search engines 360, websites 365, and augmented communications systems 370. In certain embodiments, the searches for the reduction candidates target domain specific corpus, such as Domain A corpus 340 and Domain B corpus 345, where the Domain A corpus 340 is in the same domain for which the conversational system is designed, and Domain B corpus 345 is from another domain.

In certain embodiments, a confidence level is assigned to each of the reduction candidates at operation 520. In certain embodiments, reduction candidates that have a high frequency of usage may be prioritized higher than reduction candidates having lower frequencies of usage. For example, the phrase "Flonase Sensimist Allergy Relief "could be reduced to "FSAR." However, if there is no evidence that the reduction "FSAR" is used elsewhere, it may be removed from the review candidates or given a low priority. In certain embodiments, reduction candidates found in both the Domain A corpus 340 and Domain B corpus 345 may present a potential for ambiguity when used in the intended domain (i.e., Domain A) and may be assigned a lower confidence level than terms not found in both domain corpus.

In certain instances, a phrase in the objects of the training set or phrases in search results may have falsely triggered extraction of a reduction candidate. For example, a reduction candidate may have been generated when capitalized words of a phrase span a sentence boundary. Such reduction candidates may be removed or given a low confidence level since it is unlikely that the capitalization corresponds to a phrase that may be reduced. In certain embodiments, the reduction augmentation system 248 may bypass generation of review candidates for phrases that span sentence boundaries so as not to include them in the reduction candidates at all.

Once the confidence levels have been assigned to the reduction candidates, the reduction candidates are prioritized by confidence levels at operation 525. In certain embodiments, reduction candidates having confidence levels below a certain threshold may be removed to generate the reduced set of proposed reductions. In certain embodiments, a reduction candidate may be removed before the candidate is assigned a confidence level. With an understanding of the present disclosure, it will be recognized that other manners of reducing the number of reduction candidates may be employed to generate the reduced set of proposed reductions.

Although the present invention has been described in detail, it should be understood that various changes, substitutions and alterations can be made hereto without departing from the spirit and scope of the invention as defined by the appended claims.

What is claimed is:

1. A computer-implemented method for augmenting training of a conversational system, comprising:
    ingesting a training set to be used in training of the conversational system, the training set including objects for use in the training, wherein the objects include one or more object types, wherein the object types include one or more of an entity category or intent category;
    generating proposed reductions for inclusion in an augmented training set, wherein the proposed reductions include one or more of:
        reduction candidates generated using properties of objects included in the training set;
        reduction candidates obtained from search queries of one or more external resources, wherein the search queries relate to one or more objects included in the training set;
    filtering the proposed reductions to generate a reduced set of proposed reductions which comprises:
        assigning a confidence level to each of the reduction candidates; and
        prioritizing the reduction candidates using the confidence levels; and
    augmenting the training set with the reduced set of proposed reductions or keeping only the reduced set of proposed reductions.

2. The computer-implemented method of claim 1, wherein reduction candidates generated using properties of entities included in the training set comprise:
    identifying objects having sequential capitalization of words in a row, wherein
        a proposed reduction for the identified object is generated using capitalized characters included in the sequential capitalization of the words, and
        disregarding generation of a proposed reduction for the identified object when the sequential capitalization spans a sentence break.

3. The computer-implemented method of claim 1, wherein filtering the proposed reductions comprises one or more of:
    removing proposed reductions having synthetically harvested inappropriate terms;
    validating proposed reductions using domain specific corpus; and
    validating proposed reductions using non-domain specific corpus;
    validating proposed reductions based on usage of the proposed reductions located on external resources.

4. The computer-implemented method of claim 1, wherein the external resources comprise:
    social media streams;
    domain specific search engines; and
    websites relating to an entity included in the training set.

5. The computer-implemented method of claim 1, wherein the proposed reductions include:
    reductions extracted through heuristic analysis of augmented communications systems.

6. A system comprising:
    a processor;
    a data bus coupled to the processor; and
    a computer-usable medium embodying computer program code, the computer-usable medium being coupled to the data bus, the computer program code comprising instructions executable by the processor and configured for:
        ingesting a training set to be used in training of the conversational system, the training set including objects for use in the training, wherein the objects include one or more object types, wherein the object types include one or more of an entity category or intent category;
        generating proposed reductions for inclusion in an augmented training set, wherein the proposed reductions include one or more of:
            reduction candidates generated using properties of objects included in the training set;
            reduction candidates obtained from search queries of one or more external resources, wherein the search queries relate to one or more objects included in the training set;
        filtering the proposed reductions to generate a reduced set of proposed reductions which comprises:
            assigning a confidence level to each of the reduction candidates; and
            prioritizing the reduction candidates using the confidence levels; and
        augmenting the training set with the reduced set of proposed reductions or keeping only the reduced set of proposed reductions.

7. The system of claim 6, wherein reduction candidates generated using properties of entities included in the training set comprise:
    identifying objects having sequential capitalization of words in a row, wherein
        a proposed reduction for the identified object is generated using capitalized characters included in the sequential capitalization of the words, and
        inhibiting generation of a proposed reduction for the identified object when the sequential capitalization spans a sentence break.

8. The system of claim 6, wherein filtering the proposed reductions comprises one or more of:
    removing proposed reductions having synthetically harvested inappropriate terms;
    validating proposed reductions using domain specific corpus; and
    validating proposed reductions using non-domain specific corpus;
    validating proposed reductions based on usage of the proposed reductions located on external resources.

9. The system of claim 6, wherein the external resources comprise:
    social media streams;
    domain specific search engines; and
    websites relating to an entity included in the training set.

10. The system of claim 6, wherein the proposed reductions include:
    reductions extracted through heuristic analysis of augmented communications systems.

11. The system of claim 6, wherein filtering the proposed reductions further comprises:

assigning a confidence level to each of the reduction candidates; and prioritizing the reduction candidates using the confidence levels.

12. A non-transitory, computer-readable storage medium embodying computer program code, the computer program code comprising computer executable instructions configured for:

ingesting a training set to be used in training of the conversational system, the training set including objects for use in the training, wherein the objects include one or more object types, wherein the object types include one or more of an entity category or intent category;

generating proposed reductions for inclusion in an augmented training set, wherein the proposed reductions include one or more of:

reduction candidates generated using properties of objects included in the training set;

reduction candidates obtained from search queries of one or more external resources, wherein the search queries relate to one or more objects included in the training set;

filtering the proposed reductions to generate a reduced set of proposed reductions which comprises:

assigning a confidence level to each of the reduction candidates; and prioritizing the reduction candidates using the confidence levels; and augmenting the training set with the reduced set of proposed reductions or keeping only the reduced set of proposed reductions.

13. The non-transitory, computer-readable storage medium of claim 12, wherein filtering the proposed reductions comprises one or more of:

removing proposed reductions having synthetically harvested inappropriate terms;

validating proposed reductions using domain specific corpus; and validating proposed reductions using non-domain specific corpus;

validating proposed reductions based on usage of the proposed reductions located on external resources.

14. The non-transitory, computer-readable storage medium of claim 12, wherein the external resources comprise:

social media streams;

domain specific search engines; and websites relating to an entity included in the training set.

15. The non-transitory, computer-readable storage medium of claim 12, wherein the proposed reductions include:

reductions extracted through heuristic analysis of augmented communications systems.

16. The computer-implemented method of claim 1, wherein filtering the proposed reductions further comprises:

assigning a confidence level to each of the reduction candidates; and prioritizing the reduction candidates using the confidence levels.

17. The computer-implemented method of claim 1, wherein filtering the proposed reductions further comprises:

assigning a confidence level to each of the reduction candidates; and prioritizing the reduction candidates using the confidence levels.

* * * * *